US007770745B2

(12) United States Patent
Weissmann et al.

(10) Patent No.: US 7,770,745 B2
(45) Date of Patent: Aug. 10, 2010

(54) WIDE MOUTH JAR WITH INTEGRAL SCRAPER

(75) Inventors: Dan Weissmann, Simsbury, CT (US); Michael E Penny, Saline, MI (US)

(73) Assignee: Amcor Limited, Abbotsford (AU)

( * ) Notice: Subject to any disclaimer, the term of this patent is extended or adjusted under 35 U.S.C. 154(b) by 540 days.

(21) Appl. No.: 11/455,580

(22) Filed: Jun. 19, 2006

(65) Prior Publication Data

US 2007/0289933 A1   Dec. 20, 2007

(51) Int. Cl.
*B65D 1/46* (2006.01)
*B65D 1/10* (2006.01)

(52) U.S. Cl. ............... 215/42; 215/44; 215/390; 215/392; 220/698

(58) Field of Classification Search ............. 215/40–42, 215/390–392, 44, 378; 220/695, 699, 700, 220/679, 657.659, 698; 206/349, 549, 229, 206/804
See application file for complete search history.

(56) References Cited

U.S. PATENT DOCUMENTS

| 317,950 | A | * | 5/1885 | Lilly | 220/702 |
|---|---|---|---|---|---|
| 491,198 | A | * | 2/1893 | Straus | 215/40 |
| 1,021,004 | A | * | 3/1912 | Samford | 220/735 |
| 1,383,603 | A | * | 7/1921 | Craig | 220/695 |
| 1,432,252 | A | * | 10/1922 | Leicht | 222/563 |
| D92,953 | S | * | 8/1934 | Gaynor | D9/545 |
| 3,022,916 | A | * | 2/1962 | Spooner | 215/41 |
| 3,229,841 | A | * | 1/1966 | Bailey | 215/42 |
| 3,857,506 | A | * | 12/1974 | Hafele | 215/46 |
| 4,618,515 | A | * | 10/1986 | Collette et al. | 428/36.92 |
| RE35,933 | E | * | 10/1998 | Scholl | 220/695 |
| 6,105,816 | A | * | 8/2000 | Shea | 220/697 |
| 6,228,317 | B1 | | 5/2001 | Smith et al. | |
| 6,530,500 | B2 | * | 3/2003 | Bravo et al. | 222/143 |
| 6,555,191 | B1 | | 4/2003 | Smith et al. | |
| 6,749,780 | B2 | | 6/2004 | Tobias | |
| 6,814,923 | B2 | | 11/2004 | Bromley et al. | |
| 6,841,117 | B1 | | 1/2005 | Smith et al. | |
| 6,889,866 | B2 | | 5/2005 | Gilliam et al. | |
| 2003/0192852 | A1 | * | 10/2003 | Shai et al. | 215/42 |
| 2004/0134921 | A1 | * | 7/2004 | Peacop et al. | 220/695 |

* cited by examiner

*Primary Examiner*—Sue A Weaver
(74) *Attorney, Agent, or Firm*—Harness, Dickey & Pierce, P.L.C.

(57) ABSTRACT

A one-piece plastic container includes a body defining a longitudinal axis. The body includes an upper portion, a sidewall portion and a base portion. The upper portion defines an opening into the container. The sidewall portion may be integrally formed with and extend from the upper portion to the base portion. The base portion closes off an end of the container. The opening defines a radial sidewall and a generally linear sidewall. The generally linear sidewall may be defined by an inset portion formed on the upper portion.

16 Claims, 4 Drawing Sheets

WIDE MOUTH JAR WITH INTEGRAL SCRAPER

TECHNICAL FIELD

This disclosure generally relates to plastic containers for retaining a commodity, such as a solid or semi-solid commodity. More specifically, this disclosure relates to a one-piece blown wide mouth jar having an integral scraper formed thereon.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) x 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

Typically, an upper portion of the plastic container defines an opening. This upper portion is commonly referred to as a finish and includes some means for engaging a cap or closure to close off the opening. In the traditional injection-stretch blow molding process, the finish remains substantially in its injection molded state while the container body is formed below the finish. The finish may include at least one thread extending radially outwardly around an annular sidewall defining a thread profile. In one application a closure member or cap may define a complementary thread, or threads, that are adapted to cooperatively mate with the threads of the finish.

In addition, an alternative method may be used to form the finish portion of the container. This alternative method is known as a blown finish. During this alternative process, the finish portion of the container is created in the blow mold utilizing a process similar to the blow molding process described above. This alternative process enables production of a lighter-weight finish portion, and thus container, than is possible through the traditional injection molding production method. Additionally, when produced utilizing a heat setting process, a blown finish may provide superior heat resistance characteristics as compared to traditional injection molded amorphous finishes.

In some examples, PET containers may be used to enclose spreadable commodities such as peanut butter, mayonnaise and others. Typically, such commodities are handled or removed from their containers with a household knife or other kitchen utensil. Sometimes, a larger amount of commodity is taken from the container than is actually needed. In such an instance, it may be desirable to return the unused portion back into the container.

SUMMARY

Accordingly, the present disclosure provides a one-piece plastic container having a body defining a longitudinal axis. The body includes an upper portion, a sidewall portion and a base portion. The upper portion defines an opening into the container. The sidewall portion may be integrally formed with and extend from the upper portion to the base portion. The base portion closes off an end of the container. The opening defines a radial sidewall and a generally linear sidewall. The generally linear sidewall may be defined by an inset portion formed on the upper portion.

According to additional features, the radial sidewall and the linear sidewall are co-planar. According to one example, a majority of the opening is defined by the radial sidewall. The upper portion may include a finish defining at least one thread thereon. The finish may define a sloped portion extending between the cylindrical sidewall and the linear sidewall of the opening.

Additional benefits and advantages of the present disclosure will become apparent to those skilled in the art to which the present disclosure relates from the subsequent description and the appended claims, taken in conjunction with the accompanying drawings. It will also be appreciated by those skilled in the art to which the present disclosure relates that the container of the present disclosure may be manufactured utilizing alternative blow molding processes to those disclosed above.

DETAILED DESCRIPTION

The following description is merely exemplary in nature, and is in no way intended to limit the disclosure or its application or uses.

Figure 1:
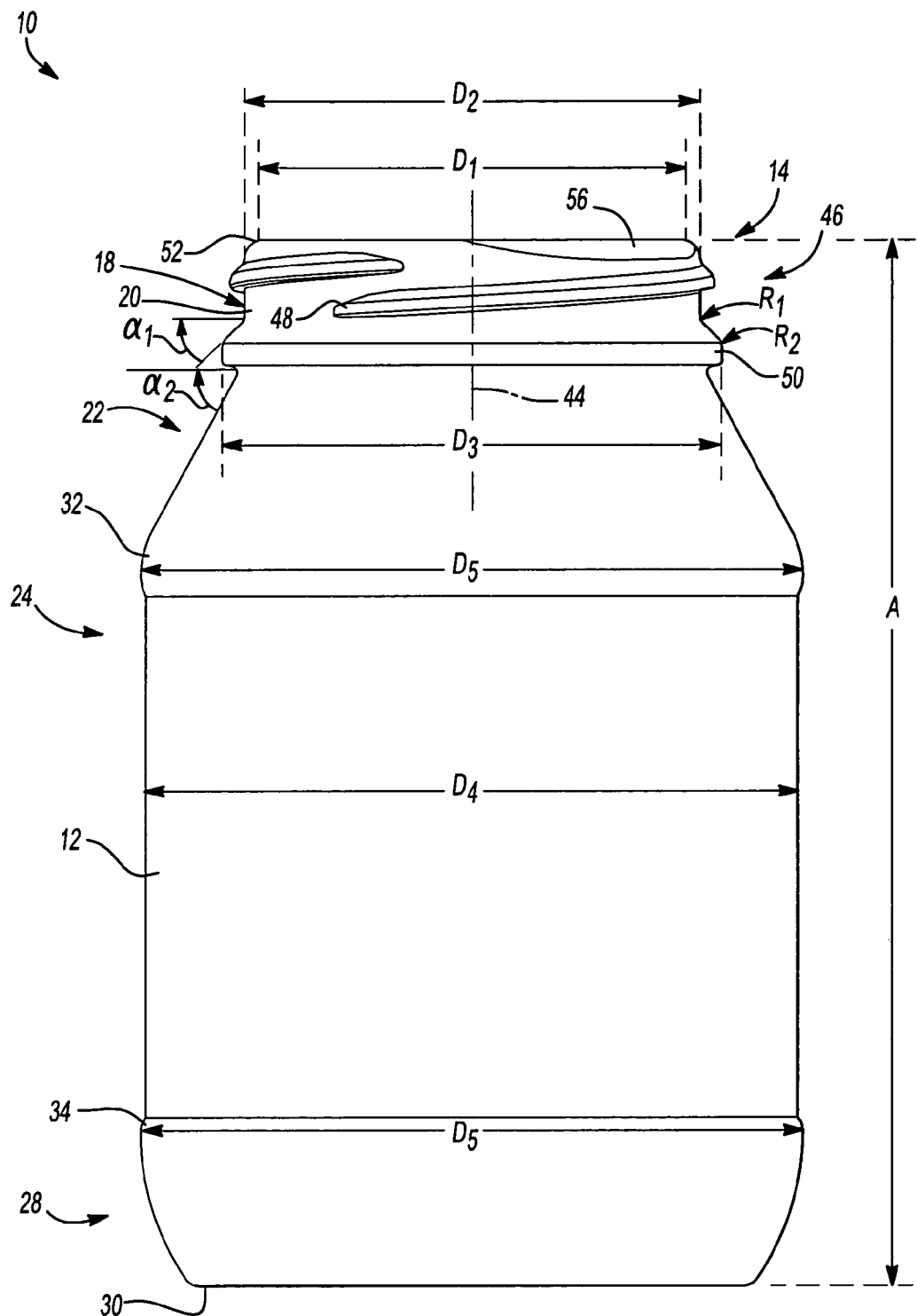
FIG. 1 is a side elevational view of a one-piece plastic container constructed in accordance with the teachings of the present disclosure.
Figure 2:
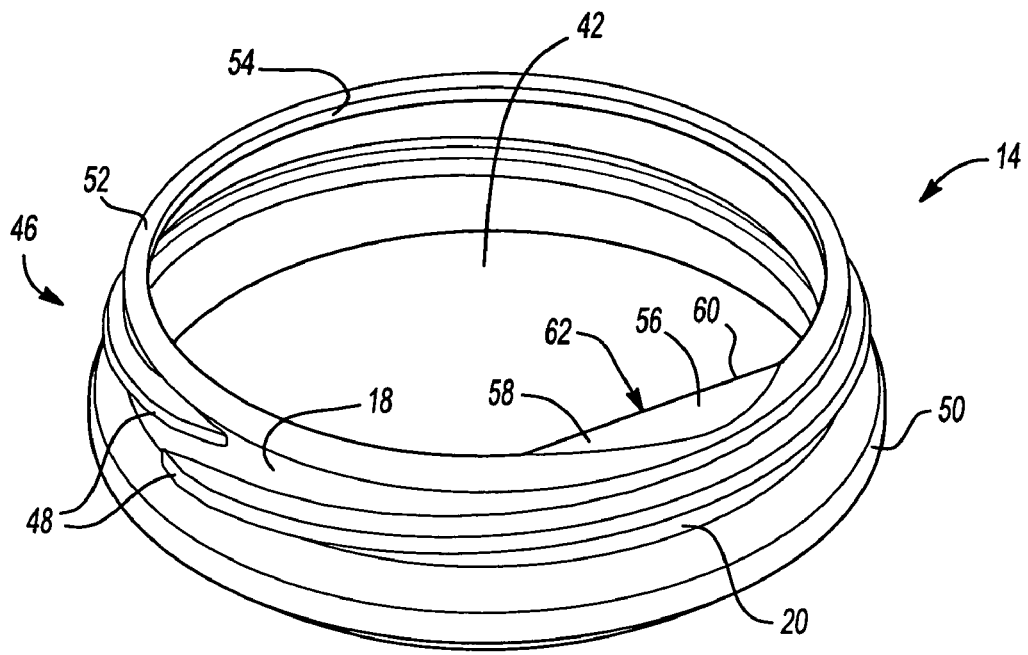
FIG. 2 is an elevational perspective view of an upper portion of the container of FIG. 1.
Figure 3:
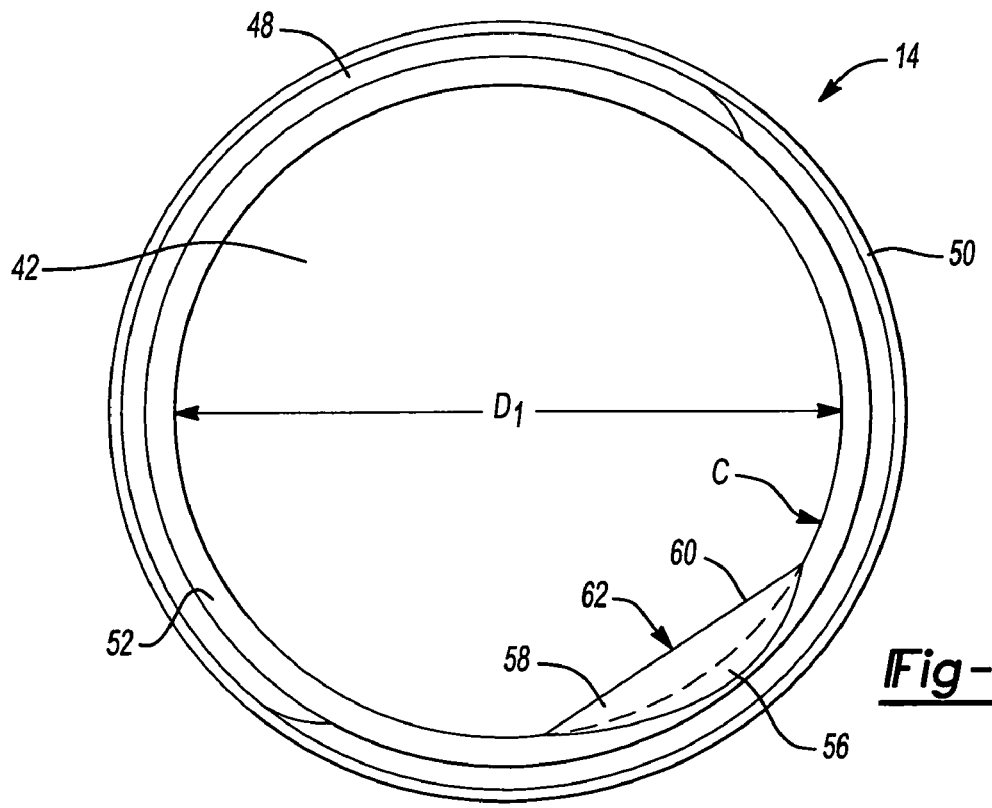
FIG. 3 is a top view of the container of FIG. 1.

FIGS. 1-5 show one embodiment of the present container. In the Figures, reference number 10 designates a one-piece plastic, e.g. polyethylene terephthalate (PET), container. As shown in FIG. 1, the container 10 has an overall height A of about 162.33 mm (6.39 inch). As shown in FIGS. 2-3, the container 10 is substantially cylindrical in cross section. In this particular embodiment, the container 10 has a volume capacity of about 32 fl. oz. (945 cc). Those of ordinary skill in the art would appreciate that the following teachings of the present disclosure are applicable to other containers, such as rectangular, triangular, hexagonal, octagonal or square shaped containers, which may have different dimensions and volume capacities. It is also contemplated that other modifications can be made depending on the specific application and environmental requirements.

As shown in FIGS. 1-5, the one-piece plastic container 10 according to the present teachings defines a body 12, and includes an upper portion 14 having a cylindrical sidewall 18 forming a finish 20. Integrally formed with the finish 20 and extending downward therefrom is a shoulder region 22. The shoulder region 22 merges into and provides a transition between the finish 20 and a sidewall portion 24. The sidewall portion 24 extends downward from the shoulder region 22 to a base portion 28 having a base 30. An upper bumper portion 32 may be defined at a transition between the shoulder region 22 and the sidewall portion 24. A lower bumper portion 34 may be defined at a transition between the base portion 28 and the sidewall portion 24.

The exemplary container 10 may also have a neck (not shown). The neck may have an extremely short height, that is, becoming a short extension from the finish 20, or an elongated height, extending between the finish 20 and the shoulder region 22. The plastic container 10 has been designed to retain a commodity. The commodity may be in any form such as a solid or semi-solid product. In one example, a commodity may be introduced into the container during a thermal process, typically a hot-fill process. For hot-fill bottling applications, bottlers generally fill the container 10 with a product at an elevated temperature between approximately 155° F. to 205° F. (approximately 68° C. to 96° C.) and seal the container 10 with a closure (not illustrated) before cooling. In addition, the plastic container 10 may be suitable for other high-temperature pasteurization or retort filling processes or other thermal processes as well. In another example, the commodity may be introduced into the container under ambient temperatures.

The plastic container 10 of the present disclosure is a blow molded, biaxially oriented container with a unitary construction from a single or multi-layer material. A well-known stretch-molding, heat-setting process for making the one-piece plastic container 10 generally involves the manufacture of a preform 40 (FIG. 4) of a polyester material, such as polyethylene terephthalate (PET), having a shape well known to those skilled in the art similar to a test-tube with a generally cylindrical cross section. An exemplary method of manufacturing the plastic container 10 will be described in greater detail later.

Returning now to FIGS. 1-3, the upper portion 14 defines an opening 42. The container 10 is a wide mouth container. Accordingly, the opening 42 is a wide mouth opening, enabling the use of a spoon, knife or other utensil to remove products from the container 10. A wide mouth container is generally defined as a container whose mouth has an outer diameter which is greater than approximately one-third of the outer diameter of the finished container. The opening 42 provides access for a user to scoop out or otherwise obtain the commodity such as on a utensil. In one example, the opening 42 may define a plane perpendicular to a longitudinal axis 44 of the container 10. It is contemplated however, that the opening 42 may define a plane tilted at an angle relative to the longitudinal axis 44.

The finish 20 of the plastic container 10 may include a threaded region 46 having threads 48, and a lower sealing ridge 50. The threaded region 46 provides a means for attachment of a similarly threaded closure or cap (not illustrated). Alternatives may include other suitable devices that engage the finish 20 of the plastic container 10, such as a press-fit or snap-fit cap for example. Accordingly, the closure or cap (not illustrated) engages the finish 20 to preferably provide a hermetical seal of the plastic container 10. The closure or cap (not illustrated) is preferably of a plastic or metal material conventional to the closure industry and suitable for subsequent thermal processing, including high temperature pasteurization and retort.

With specific reference to FIGS. 1-3, a land 52 may be formed radially at a transition between the finish 20 and the opening 42. In this way, the opening 42 may be radially stepped inward relative to the finish 20. The opening 42 of the container 10 generally defines a radial sidewall 54 having an inset portion 56. A sloped portion 58 may be formed between the cylindrical sidewall 18 and the opening 42. The inset portion 56 terminates at a generally linear sidewall 60 formed at the opening 42. As used herein, the term linear directed toward the linear sidewall 60 may denote a substantially linear surface. In this way, the linear sidewall 60 may comprise a completely linear sidewall, a slightly arcuate sidewall or a collection of slightly arcuate and linear sidewalls.

In one example, the linear sidewall 60 may be used to scrape excess or an unused portion of the commodity back into the container 10. In this way, a utensil, such as a knife (not shown) for example, may be slidably advanced along the linear sidewall 60 whereby the excess or an unused portion of the commodity may be transferred from the utensil back into the container 10 at the linear sidewall 60. The geometry of the opening 42 at the linear sidewall 60 is particularly advantageous because a substantially linear engagement surface 62 is defined thereat. The linear engagement surface 62 may cooperate with a planar portion of a utensil, such as a knife, such that mutual contact between the linear engagement surface 62 and the planar portion of the knife may be easily maintained while slidably advancing the knife along the linear engagement surface 62.

In one example, the linear sidewall 60 may define a length of about 25.40 mm (1 inch). In this way, a typical household knife may be accommodated across its entire width along the linear sidewall 60. Other lengths are contemplated. The opening 42 may define a diameter $D_1$ of about 63.6 mm (2.5 inch). The opening 42 (assuming a uniform diameter around the opening) may define a circumference C of about 199.81 mm (7.83 inch). The circumference C referenced utilizes the dashed line through the inset portion 56. As a result, it is appreciated that the actual realized circumference is slightly smaller. Notably, the exemplary dimensions provide a container 10 having an opening 42 that is approximately defined by 14% linear sidewall 60 and 86% radial sidewall 54. Again, these dimensions are exemplary.

With continued reference now to FIGS. 1-3, exemplary dimensions for the container 10 will be described. It is appreciated that other dimensions may be used. A diameter $D_2$ of the finish 20 may be 67.46 mm (2.66 inch). A diameter $D_3$ of the lower sealing ridge 50 may be 73.91 mm (2.91 inch). The body 12 may define a diameter $D_4$ of 96.27 mm (3.79 inch) at a label portion. A diameter $D_5$ of the upper and lower bumper portions 32 and 34, respectively, may be 97.79 mm (3.85 inch). An angle $\alpha_1$ at which the lower sealing ridge 50 extends from a line perpendicular to the finish 20 may be about 45 degrees. An angle $\alpha_2$ at which the shoulder region 22 extends from a line perpendicular to the finish 20 may be about 62 degrees. Radii $R_1$ and $R_2$ defined at the transition between the finish 20 and the lower sealing ridge 50 may be 1.52 mm (0.06 inch).

Figure 4:
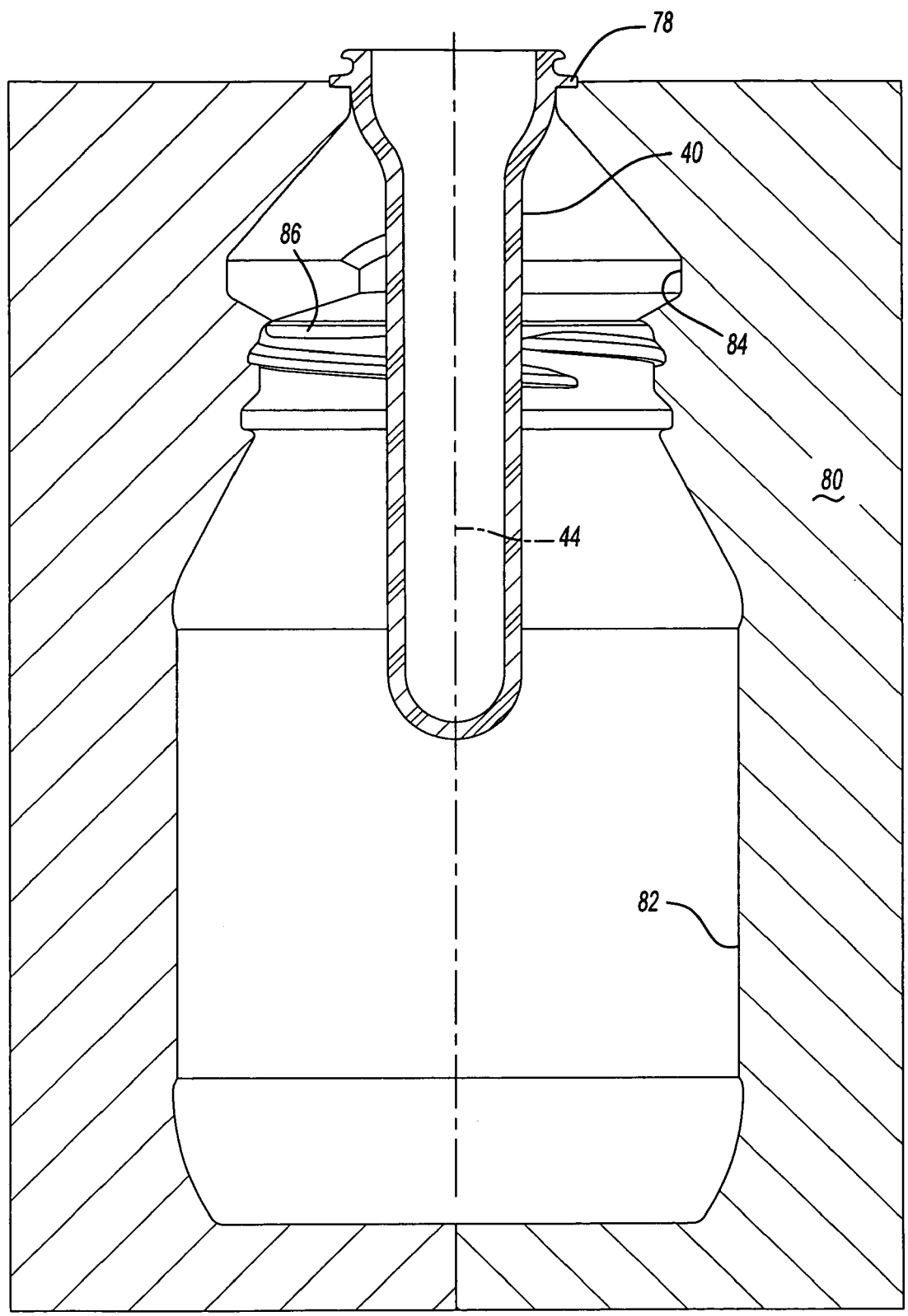
FIG. 4 is a sectional view of an exemplary mold cavity used during formation of the container of FIG. 1 and shown with a preform positioned therein.
Figure 5:
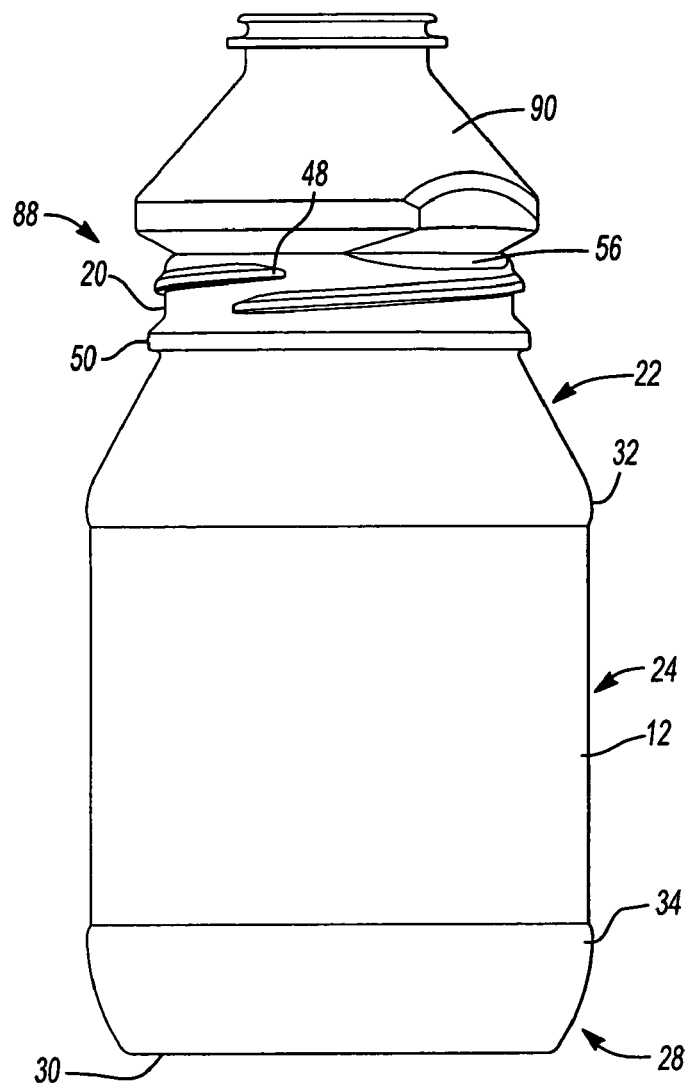
FIG. 5 is a side elevational view of the container of FIG. 1 shown prior to moil resection.

Turning now to FIG. 4, an exemplary method of forming the container 10 will be described. The preform 40 includes a support ring 78, which may be used to carry or orient the preform 40 through and at various stages of manufacture. For example, the preform 40 may be carried by the support ring 78, the support ring 78 may be used to aid in positioning the preform 40 in a mold cavity 80, or the support ring 78 may be used to carry an intermediate container 88 once molded. At the outset, the preform 40 may be placed into the mold cavity 80 such that the support ring 78 is captured at an upper end of the mold cavity 80. In general, the mold cavity 80 has an interior surface corresponding to a desired outer profile of the blown container. More specifically, the mold cavity 80 according to the present teachings defines a body forming region 82, a moil forming region 84 and an opening forming region 86. Once the resultant structure, hereinafter referred to as an intermediate container 88, has been formed, a moil 90 (FIG. 5) created by the moil forming region 84 may be severed and discarded. It is appreciated that the step of severing the moil 90 at the intersection between the land 52 and the moil 90 defines the opening 42 (and the respective radial and linear sidewalls 54 and 60) of the container 10.

In one example, a machine (not illustrated) places the preform 40 heated to a temperature between approximately 190° F. to 250° F. (approximately 88° C. to 121° C.) into the mold cavity 80. The mold cavity 80 may be heated to a temperature between approximately 250° F. to 350° F. (approximately 121° C. to 177° C.). A stretch rod apparatus (not illustrated) stretches or extends the heated preform 40 within the mold cavity 80 to a length approximately that of the intermediate container 88 thereby molecularly orienting the polyester material in an axial direction generally corresponding with the central longitudinal axis 44 of the container 10. While the stretch rod extends the preform 40, air having a pressure between 300 PSI to 600 PSI (2.07 MPa to 4.14 MPa) assists in extending the preform 40 in the axial direction and in expanding the preform 40 in a circumferential or hoop direction thereby substantially conforming the polyester material to the shape of the mold cavity 80 and further molecularly orienting the polyester material in a direction generally perpendicular to the axial direction, thus establishing the biaxial molecular orientation of the polyester material in most of the intermediate container 88. The pressurized air holds the mostly biaxial molecularly oriented polyester material against the mold cavity 80 for a period of approximately two (2) to five (5) seconds before removal of the intermediate container 88 from the mold cavity 80. This process is known as heat setting and results in a heat-resistant container suitable for filling with a product at high temperatures.

In another example, a machine (not illustrated) places the preform 40 heated to a temperature between approximately 185° F. to 239° F. (approximately 85° C. to 115° C.) into the mold cavity 80. The mold cavity 80 may be chilled to a temperature between approximately 32° F. to 75° F. (approximately 0° C. to 24° C.). A stretch rod apparatus (not illustrated) stretches or extends the heated preform 40 within the mold cavity 80 to a length approximately that of the intermediate container 88 thereby molecularly orienting the polyester material in an axial direction generally corresponding with the central longitudinal axis 44 of the container 10. While the stretch rod extends the preform 40, air having a pressure between 300 PSI to 600 PSI (2.07 MPa to 4.14 MPa) assists in extending the preform 40 in the axial direction and in expanding the preform 40 in a circumferential or hoop direction thereby substantially conforming the polyester material to the shape of the mold cavity 80 and further molecularly orienting the polyester material in a direction generally perpendicular to the axial direction, thus establishing the biaxial molecular orientation of the polyester material in most of the intermediate container 88. The pressurized air holds the mostly biaxial molecularly oriented polyester material against the mold cavity 80 for a period of approximately two (2) to five (5) seconds before removal of the intermediate container 88 from the mold cavity 80. This process is utilized to produce containers suitable for filling with product under ambient conditions or cold temperatures.

Alternatively, other manufacturing methods, such as for example, extrusion blow molding, one step injection stretch blow molding and injection blow molding, using other conventional materials including, for example, high density polyethylene, polypropylene, polyethylene naphthalate (PEN), a PET/PEN blend or copolymer, and various multilayer structures may be suitable for the manufacture of plastic container 10. Those having ordinary skill in the art will readily know and understand plastic container manufacturing method alternatives.

Figure 6:
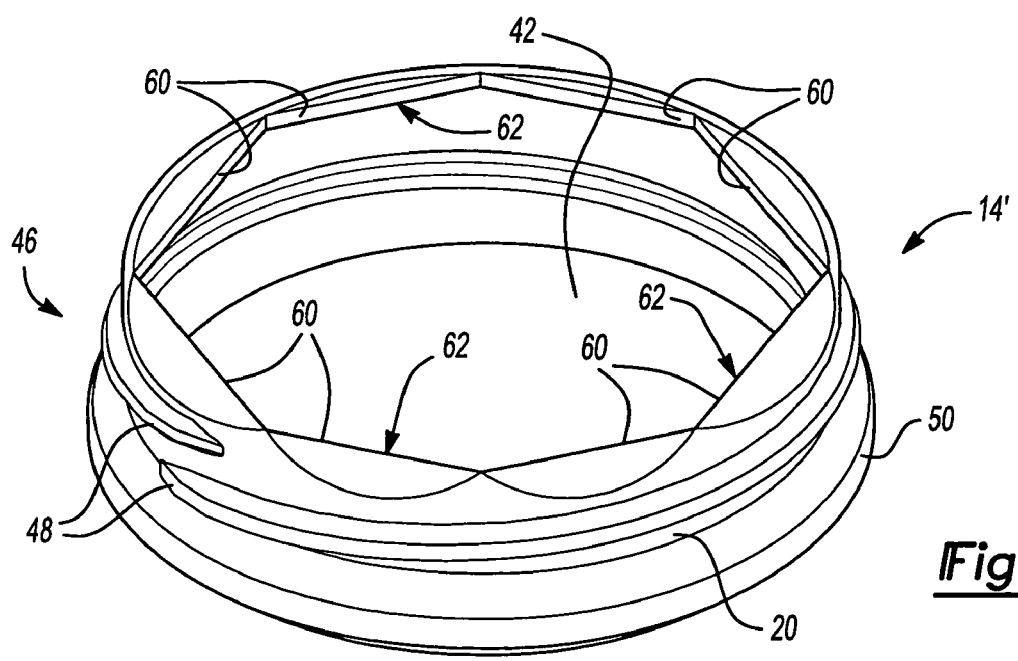
FIG. 6 is a top perspective view of an upper portion of a container constructed in accordance with additional features.

With reference now to FIG. 6, an upper portion 14' according to additional teachings is shown. The upper portion 14' generally defines a plurality of generally linear sidewalls 60 having linear engagement surfaces 62 at the opening 42. Specifically, eight (8) linear sidewalls 60 are defined around the opening 42. As a result, a linear sidewall 60 is defined at about every 45 degrees around the opening 42. It is appreciated that more or fewer linear sidewalls 60 may be defined around the opening 42. The plurality of linear sidewalls 60 allows a user to arbitrarily grasp the container 10 with one hand and locate a linear engagement surface 62 in close proximity to a knife grasped by the other hand. The knife may then be swiped or scraped along the identified linear engagement surface 62 with little or no rotation of the container 10 in order to return the excess or unused portion of the commodity back into the container 10.

While the above description constitutes the present disclosure, it will be appreciated that the disclosure is susceptible to modification, variation and change without departing from the proper scope and fair meaning of the accompanying claims.

What is claimed is:

1. A one-piece plastic container comprising:
a body defining a longitudinal axis and having an upper portion, a sidewall portion and a base portion, said upper portion defining an opening into said container and including a finish, said sidewall portion integrally formed with and extending from said upper portion to said base portion, said base portion closing off a first terminal end of said container, wherein said upper portion includes an upper lip at a second terminal end of said container, said upper lip defining said opening, said upper lip including a curved portion and a completely linear portion, the curved portion and the completely linear portion being co-planar, the curved portion following a portion of an imaginary continuous and closed curve, the completely linear portion lying within said imaginary continuous and closed curve, the completely linear portion having a first and second endpoint that each intersect said curved portion, said finish being entirely disposed between said upper lip and said sidewall portion along the longitudinal axis.

2. The one-piece plastic container of claim 1 wherein said completely linear portion is defined by an inset portion formed on said upper portion of said body.

3. The one-piece plastic container of claim 1, wherein a majority of said upper lip is defined by said curved portion.

4. The one-piece plastic container of claim 3 wherein at least three-fourths of said upper lip is defined by said curved portion.

5. The one-piece plastic container of claim 1 wherein said finish defines at least one thread thereon.

6. The one-piece plastic container of claim 5 wherein said finish defines a generally cylindrical sidewall having said at least one thread thereon.

7. The one-piece plastic container of claim 1 wherein said completely linear portion is approximately one inch (25.4 mm) in length.

8. A one-piece plastic container having a longitudinal axis comprising:
an upper portion including an upper lip at a second terminal end of the container, the upper lip defining an opening into the container, the upper portion also including a finish;
a shoulder region integrally formed with and extending from said upper portion; and
a sidewall portion extending from said shoulder region to a base portion, said base portion closing off a first terminal end of said container;
wherein said upper lip includes a curved portion and a completely linear portion, the curved portion and the completely linear portion being co-planar, the curved portion following a portion of an imaginary continuous and closed curve, the completely linear portion lying within said imaginary continuous and closed curve, the completely linear portion having a first and second endpoint that each intersect said curved portion, said finish being entirely disposed between said upper lip and said sidewall portion along the longitudinal axis.

9. The one-piece plastic container of claim 8 wherein said completely linear portion is defined by an inset portion formed on said upper portion.

10. The one-piece plastic container of claim 8 wherein a majority of said upper lip is defined by said curved portion.

11. The one-piece plastic container of claim 8 wherein said upper portion includes a generally cylindrical sidewall and said finish includes at least one thread formed on the generally cylindrical sidewall.

12. The one-piece plastic container of claim 8 wherein said completely linear portion is approximately one inch (25.4 mm) in length.

13. The one-piece plastic container of claim 8 wherein said upper lip includes a plurality of completely linear portions.

14. A one-piece plastic container comprising:
a body defining a longitudinal axis and having an upper portion, a sidewall portion and a base portion, said upper portion defining an opening into said container and including a finish, said sidewall portion integrally formed with and extending from said upper portion to said base portion, said base portion closing off a first terminal end of said container, wherein said upper portion includes a cylindrical portion, an inset portion, and an upper lip at a second terminal end of said container, said finish formed on said cylindrical portion, said upper lip defining said opening, said upper lip including a curved portion and a completely linear portion, the curved portion and the completely, linear portion being co-planar, the curved portion following a portion of an imaginary continuous and closed curve, the completely linear portion lying within said imaginary continuous and closed curve, the completely linear portion having a first and second endpoint that each intersect said curved portion, said finish being entirely disposed between said upper lip and said sidewall portion along the longitudinal axis, the completely linear portion defined by the inset portion.

15. The one-piece plastic container of claim 14 wherein said completely linear portion is approximately one inch (25.4 mm) in length.

16. The one-piece plastic container of claim 14 wherein said upper lip includes a plurality of completely linear portions.

* * * * *